Patented Sept. 2, 1924.

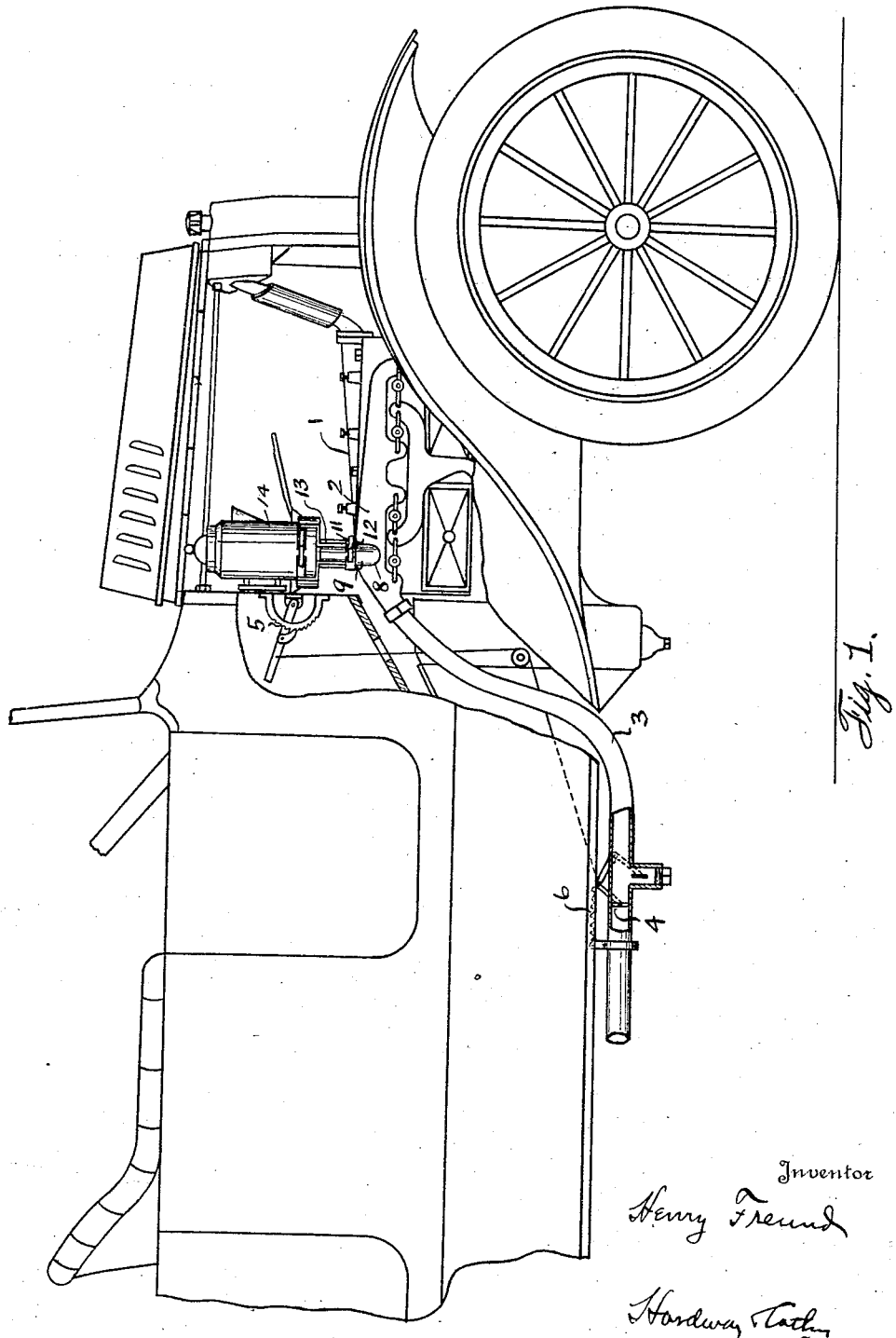

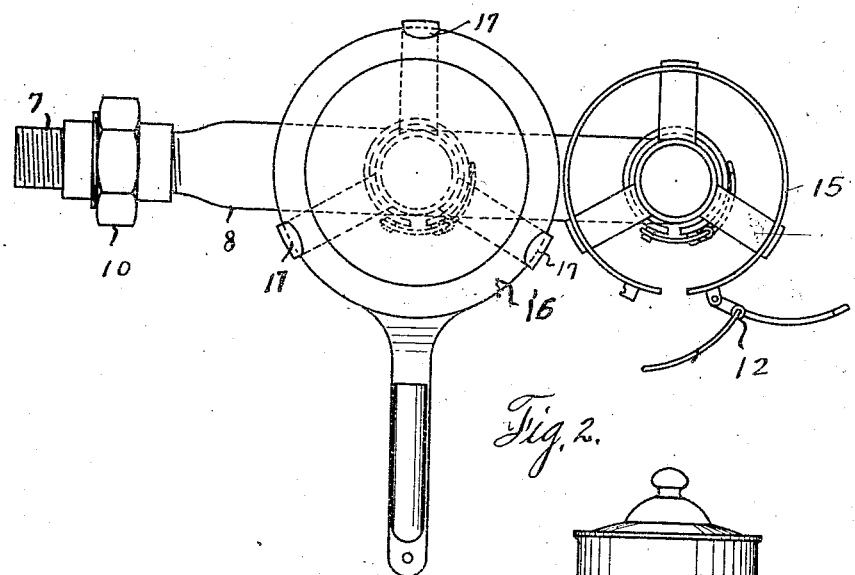
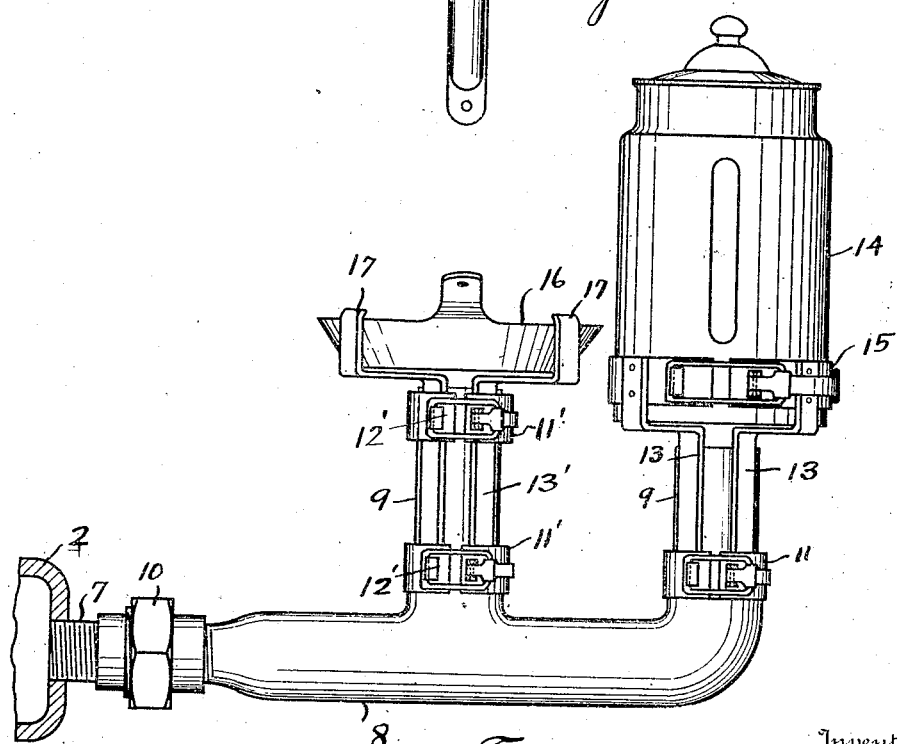

1,507,112

UNITED STATES PATENT OFFICE.

HENRY FREUND, OF HOUSTON, TEXAS.

COOKING ATTACHMENT FOR INTERNAL-COMBUSTION MOTORS.

Application filed February 25, 1924. Serial No. 695,934.

*To all whom it may concern:*

Be it known that I, HENRY FREUND, a citizen of the United States, residing at Houston, in the county of Harris and State of Texas, have invented certain new and useful Improvements in a Cooking Attachment for Internal-Combustion Motors, of which the following is a specification.

This invention relates to new and useful improvements in a cooking attachment for internal combustion motors.

One object of the invention is to provide an attachment of the character described specially designed for attachment to the exhaust manifold and through which the heat and flame from said exhaust manifold may be utilized for cooking, and other similar purposes.

Another object of the invention is to provide a device of the character described which may be easily attached to and detached from the manifold of the motor.

With the above and other objects in view this invention has particular relation to certain novel features of construction, arrangement of parts and use, an example of which is given in this specification and illustrated in the accompanying drawings, wherein:—

Figure 1 shows a side view of a motor, as mounted in a vehicle and showing the attachment as applied in use.

Figure 2 shows a plan view of the attachment; and,

Figure 3 shows a side view thereof.

Referring now more particularly to the drawings, the numeral 1 designates the motor and the numeral 2 designates the exhaust manifold thereof. Leading from this manifold is the exhaust pipe 3 which may be opened and closed by the valve 4, which is arranged to be closed through a suitable hand operated mechanism as 5, and normally held opened through the pull spring 6.

A tubular nipple 7 is tapped into the manifold 2. Connected to this tubular nipple there is a tubular heater manifold 8, upstanding from which there is one, or more, tubular necks, as 9. The manifold 8 is connected to the nipple 7 by means of the usual union 10.

One neck 9 has a circular clamp, as 11, secured therearound by means of a releasable latch arrangement 12 of well known construction.

Vertical stay bars 13 are secured to said clamp and their upper ends are outwardly turned to form a support for a coffee pot 14, or similar cooking utensil. The extreme upper ends of the bars 13 are upturned and attached to said upturned ends there is a circular clamp 15 arranged to be held clamped around said utensil 14 also by means of a releasable latch 12.

The other neck 9 has a plurality of circular clamps 11', 11' clamped around it by means of releasable latches, as 12'. There are vertical bars 13' secured to the clamps 11' and their upper ends are outturned to form a support for pans and the like, as 16, said upturned ends being formed with engaging hooks 17 which engage over the edges of said pan.

The cooking utensils are thus securely held spaced above the tubular necks 9, and can easily be secured in position or dismounted.

The valve 4 may be closed to divert the heat and flame from the exhaust through the necks 9, or said valve may be only partly closed and the heat supplied to the cooking utensils thus regulated.

The attachment may be dismounted from the motor, if desired, and the tapped hole into which the nipple 7 is threaded, then plugged as in an obvious manner.

What I claim is:

1. The combination with an internal combustion motor, of a tubular member connected into the exhaust manifold thereof, and formed with an upturned tubular neck, means for securing a utensil to be heated above the discharge end of said neck, said means including a releasable clamp adapted to be secured around said neck and clamp members attached to said clamp and formed to releasably engage with said utensil.

2. The combination with an internal combustion motor, of a tubular member connected into the manifold thereof and formed with an upstanding tubular neck, a clamp member releasably secured around said neck, stay bars attached to said clamp, and upstanding therefrom, the upper ends of said bars being outturned to form a support, and means carried by said upper ends and formed into engaging means to engage with an object on said support.

3. An attachment of the character described including a tubular member formed with an outstanding tubular neck, a clamp device releasably secured to said neck, stays attached to said neck and outwardly turned forming a support, and means carried by the stays, for engaging with, and securing an object on said support.

4. An attachment of the character described including a tubular manifold having a tubular upstanding neck, a clamp releasably secured on said neck, stays upstanding from the clamp and outwardly turned forming a support, and engaging means carried by the stays, and adapted to engage with an object on said support.

In testimony whereof I have signed my name to this specification in the presence of two subscribing witnesses.

HENRY FREUND.

Witnesses:
WM. A. CATHEY,
JOHN WM. PALMER.